March 8, 1949.  D. L. WOOD  2,464,166
SPLIT FIELD RANGE FINDER FOR CAMERAS
INTERCONNECTED TO CAMERA LENS
Filed Jan. 5, 1946  2 Sheets-Sheet 1
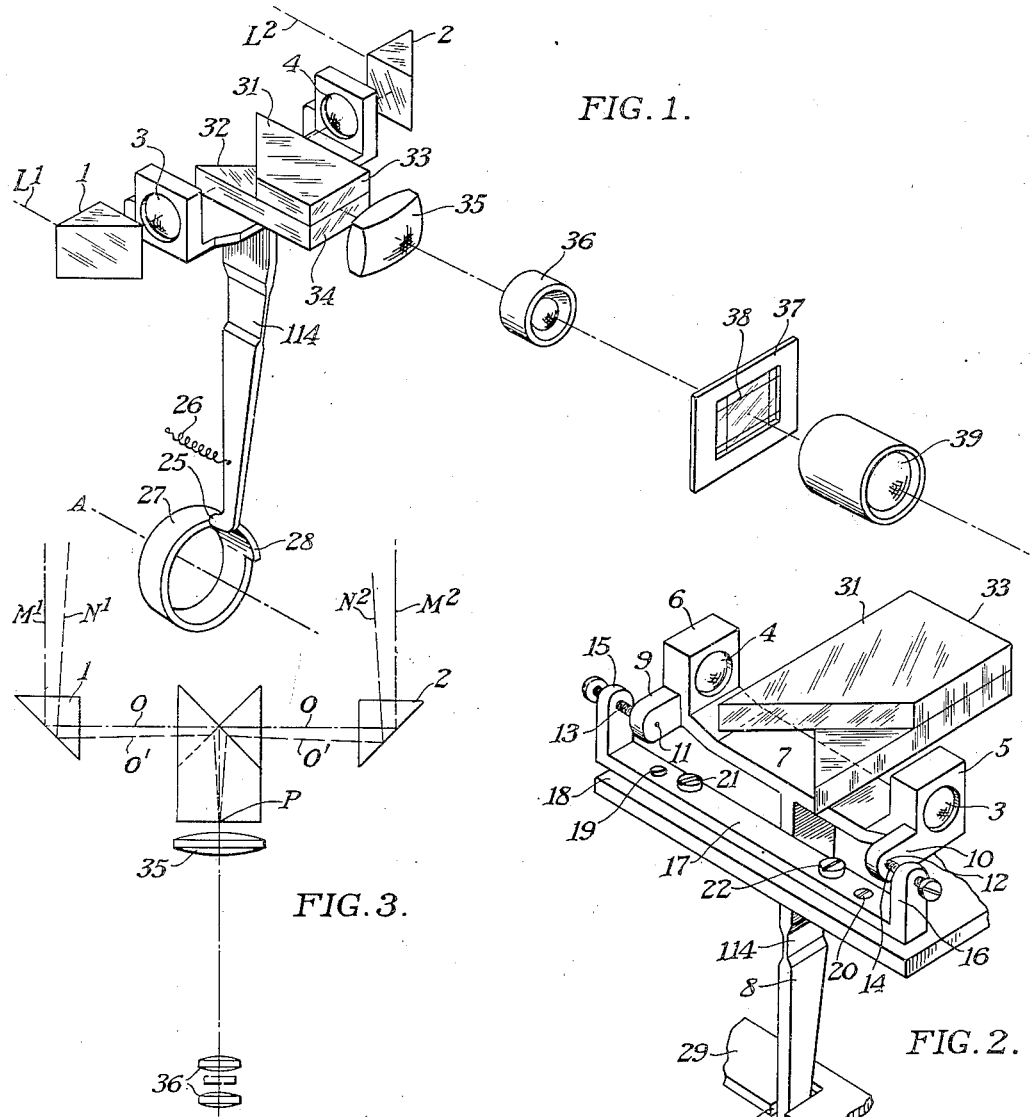
DONALD L. WOOD
INVENTOR

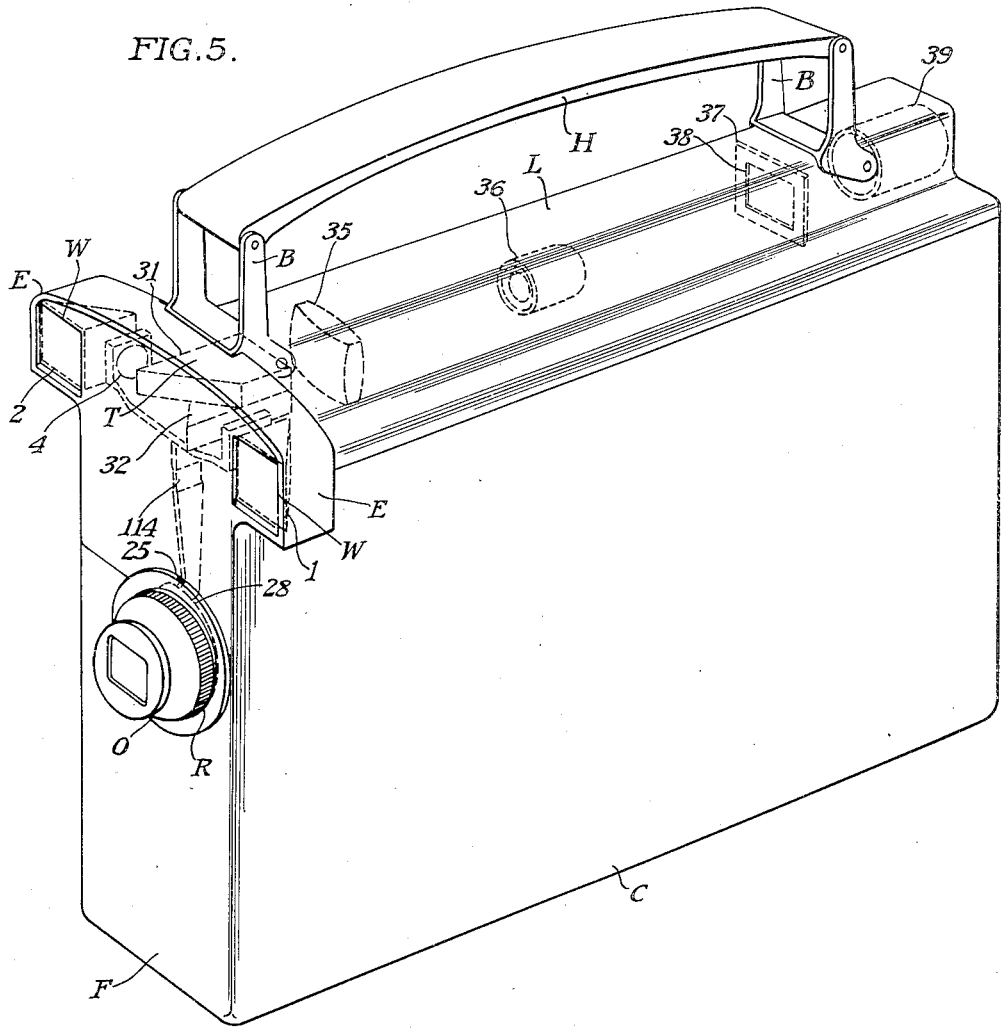

Patented Mar. 8, 1949

2,464,166

UNITED STATES PATENT OFFICE

2,464,166

SPLIT FIELD RANGE FINDER FOR CAMERAS INTERCONNECTED TO CAMERA LENS

Donald L. Wood, Rochester, N. Y., assignor to Eastman Kodak Company, Rochester, N. Y., a corporation of New Jersey Application January 5, 1946, Serial No. 639,343

5 Claims. (Cl. 95—44)

This invention relates to range finders for cameras and particularly to a range finder in which the parts are particularly arranged to facilitate proper assembly. One object of my invention is to provide a range finder with objectives, each forming a portion of an image to be ranged, and each movable together and to the same extent for focusing. Another object of my invention is to provide a split field coincidence type of range finder in which the movement of a single member, connected to the camera focusing mechanism, will adjust the range finder for focusing and simultaneously correct for parallax. A still further object of my invention is to provide a range finder which may also be used as a view finder. Other objects will appear from the following specification, the novel features being particularly pointed out in the claims at the end thereof.

In the camera range finder shown in Patent 1,991,110, Mihalyi, granted February 12, 1935, there is shown a range finder having a number of features quite similar to my present invention, but this patent does not include a pair of relatively movable range finder lenses which can be mounted and assembled as a unit in a yoke which forms the sole movable part of the mechanism. There are certain other differences which will be clearly brought out in the specification and which are particularly directed to providing a means for initially setting up the range finder and for correlating it with the focusing part of a camera.

Coming now to the drawings wherein like reference characters denote like parts throughout:

Fig. 1 is a schematic perspective view of a range finder constructed in accordance with and embodying a preferred form of my invention, this range finder being particularly designed for a long, narrow camera;

Fig. 2 is a fragmentary perspective view of the movable mount for the range finder objectives showing the objective yoke and bracket, together with useful adjustments for these parts;

Fig. 3 is a diagrammatic view of the range finder to facilitate understanding of the operation of the optics of this finder;

Fig. 4 is a fragmentary detailed section showing schematically how my improved form of range finder may be applied to a narrow camera, such as to an end wall of known types of folding cameras, where the length of the range finder is transverse to the width of the camera;

Fig. 5 is a perspective view of a camera equipped with a range finder constructed in accordance with and embodying a preferred form of my invention.

In its broadest aspects, my invention relates to a camera range finder in which two like objectives are used and in which these objectives are rigidly mounted with respect to each other in a pivotally-mounted yoke which is moved by a focusing part of the camera. There are many advantages in this form of twin-lens system because it enables an operator to readily set up the range finder in assembly, and it absolutely retains the image portions formed by the two lenses in their correct relative relationship.

My improved range finder may be built into a motion picture camera similar to the range finder shown in Patent 2,029,932, Mihalyi, granted February 4, 1936, wherein Fig. 4 of the drawing shows a camera of known type. Referring to applicant's Fig. 5, the camera C may be of a generally rectangular shape having a front wall F on which a known type of objective O may be mounted, this objective having a focusing ring R which may be turned to simultaneously turn cam 28. There may be an elongated housing L on the top of the camera to enclose the various elements of the range finder to be later described. This housing may support brackets B and a handle H and the housing has transverse elongated portions with extensions E to each side of the camera wall; these extensions being provided with spaced windows W inside of which range finder parts may be mounted, as will be later described. The camera and housing, as evidenced by the Mihalyi patent, is not new, but my improved form of range finder relates particularly to a particular means for mounting certain parts of the optical system of the range finder.

Referring to Fig. 1, my range finder may include a pair of spaced prisms, or reflectors, 1 and 2, which reflect the beams of light L1 and L2 at substantially right angles, so that these beams pass through a pair of similar lenses 3 and 4, these lenses being the objective lenses of the range finder. The lenses 3 and 4 are carried in suitable mounts 5 and 6 carried by a yoke member 7, having a downwardly-extending arm 8 and including ears 9 and 10 having cone-shaped bearings 11 and 12 to receive the cone-shaped ends of the screws 13 and 14 which pivotally mount the yoke 7 in its proper position. The yoke 7 is substantially Y shaped when viewed from the front, and it is preferably made of an integral piece of metal. The arm 8 should be provided with a transversely flexible portion 114 which may be formed by cutting away the metal to form a thin member, as shown in the drawings.

The yoke 7 may be pivotally mounted on the upturned ears 15 and 16 of a bracket 17 which is mounted on a camera part 18 by means of the screws 19, 20, 21, and 22. Thus, in the bracket and yoke alone there are sufficient adjustments to permit the range finder optics to be quickly and easily set up and aligned, because the yoke 7 may be adjusted axially of its pivotal mount by adjusting the screws 13 and 14 and because the bracket 17 may be adjusted by means of the screws above mentioned. Thus, by loosening the screws 21 and 22, the screws 19 and 20 can be turned the required distance to permit the relationship of the bracket 7 to the plate 18 to be changed in a direction parallel to the camera plate 18, or at a limited angle therefrom. These adjustments can be readily made in setting up the range finder.

The arm 8 has a portion 25 which is adapted to be spring-held as by a spring 26 into engagement with the focusing part 27 of the camera. In this instance, the focusing member 27 may consist of a cam 28 which is turned to focus the main camera objective which may lie on the axis A, as indicated in Fig. 1. However, the focusing part of the camera may be any of the usual focusing parts, such as a movable lens board, a movable lens element, or any mount moving the complete objective.

Since the bracket 17 and the yoke 7 may be moved in various directions, and since it is necessary for the end 25 of the arm 8 to engage with the focusing element of the camera, it is desirable for the arm to remain in the proper position and, in order to accomplish this, I provide a plate 29 on the camera with a guideway here shown as a slot 30 in which the arm 8 may move and by which it may be guided. In order to compensate for and permit the necessary adjustments to be made to the bracket 17 and the yoke 7, the flexible area 114 has a sufficient transverse flexibility to allow for these usually rather slight adjustments of the parts and still to permit the arm 8 to engage with the proper part of the focusing camera element. The metal of the area 114 of the arm 8 is so reduced in thickness that it may flex transversely of the arm to permit the aforesaid adjustments, but at the same time there is sufficient metal to prevent flexure of this arm in the direction of rotation of the yoke 7 about its pivotal supports 13 and 14.

I provide a pair of coincidence prisms 31 and 32, one over the other, these two prisms providing substantially at or near their rear faces 33 and 34 a first focal plane. There is a field lens 35 behind these coincidence prisms and a compound erector lens 36 behind the field lens. I prefer to provide a mask 37 in axial alignment with the lens 36 and may provide this mask with adjustable view defining lines 38, although this forms no part of the present invention. Behind the mask 37 there is an ocular 39.

The operation of the range finder thus described is indicated in Fig. 3, it being understood that the ranging is accomplished through identical movements of the objective lenses 3 and 4. In Fig. 3 I have shown only the optical centers of these lenses from which it will appear that when parallel rays M1 and M2 are reflected by the prisms 1 and 2, coincidence of the two halves of the field at the point P will occur for an object at infinity. When the range finder is focused at infinity, the centers of the lenses 3 and 4 are represented by the dots 0—0. When, however, the centers of these lenses are moved from the 0—0 position to the 0'—0' position, the converging rays N1 and N2 will be focused on an object which is close by, or nearer than infinity according to the convergence of these rays.

I have found that by selecting the proper position for the pivotal points of the lenses 3 and 4—that is, a point forwardly of the axis of these lenses and somewhat below the axis of these lenses that the focusing movement is accurately accomplished and, at the same time, there is a very close approximation of complete parallax correction. The lenses 3 and 4, of course, move through an arcuate path and for perfect parallax correction this path should be a straight line path. However, the movement of these lenses is comparatively slight and for all practical purposes, parallax is adequately corrected for, so that the view through the ocular 39 will not only indicate when the camera is in focus, but also the proper field of view.

It is quite possible to apply my invention to the ordinary roll-holding camera which has only a narrow wall as diagrammatically illustrated in Fig. 4. In this figure I provide reflectors 51 and 52 and range finder objective lenses 53 and 54. It is understood that these lenses are mounted in a yoke and on a bracket similar to the mount for lenses 3 and 4 of the range finder shown in Figs. 1 and 2. The coincidence prisms 55 and 56 are positioned, as shown in Fig. 4, and a reflector 57 is employed to reflect the image from an image plane at or near the surfaces 56' of the prisms 55 and 56. An objective 58 is mounted between the mirror 57 and a second mirror 59 and the image may be framed by a frame 60 in front of the eyepiece 61. Thus, the optical system is "folded" to compensate for the lack of length in the camera wall 62, but optically, this range finder is much the same as the one first described.

It should be noticed that with both forms of my range finder, the usually more or less difficult part of the assembly is made quite simple in that the yoke 7 is a solid integral piece in which the lenses 3, 4, or, 53 and 54, can be accurately set in the proper position with respect to each other and with their axes identical so that by shifting the yoke 7 and the bracket 17, the two half images can be very easily and very accurately adjusted. By altering the position of the screws 19, 20, 21, and 22, which are the adjustment screws for the bracket 17, and by shifting the axis of the two lense 3 and 4 by means of the two screws 13 and 14, the assembly can be readily and quickly performed, since all of the fixedly-mounted parts of the optical system, such as the prisms 1 and 2, the field lens 35, and the erecting lens 36, can readily be mounted on a separate part which may be attached to the camera and they can be assembled with suitable jigs and fixtures. The main difficulty of adjusting the movable reflector, or one movable lens, with respect to a second fixed lens, which has previously made range finder adjustments considerably more difficult, have thus been eliminated.

I claim:

1. A range finder adapted for use on cameras having a focusing lens and a cam movable thereby, said range finder comprising spaced reflectors positioned to accept two beams of light from an object and bend said beams toward each other, a pair of similar lenses, one for each bent beam and coaxially arranged, a pair of coincidence prisms located one above the other, between the reflectors and having surfaces forming a focal plane for images formed by the coaxially-arranged lenses, and a telescopic viewing system directed toward the said surfaces forming a focal plane for viewing images thereon, a yoke pivotally mounted on an axis parallel to the axis of the coaxially arranged lenses and offset from said axis and rigidly carrying the two coaxially-arranged lenses in fixed relation to each other for moving said lenses transversely of their axes, and an arm for moving the yoke engaging the cam movable by the focusing lens to to adjust the images at the coincidence prisms' focal plane.

2. A range finder adapted for use on cameras, as defined in claim 1, characterized by said arm engaging the cam being flexible in one direction but not in the other.

3. A range finder adapted for use on cameras, as defined in claim 1, characterized by said arm engaging the cam being flexible in one direction but not in the other, and a guide carried by the camera for controlling the possible flexing of the arm in its flexible direction.

4. A range finder adapted for use on cameras, as defined in claim 1, characterized by a bracket carried by the camera body pivotally supporting the yoke, and means for altering the position of the bracket's relation to the camera body.

5. The range finder adapted for use on cameras, as defined in claim 1, characterized by a bracket carried by the camera body for pivotally supporting the yoke and means between the bracket and the camera body for varying the relative position of the pivotal supports for the yoke.

DONALD L. WOOD.

REFERENCES CITED

The following references are of record in the file of this patent:

UNITED STATES PATENTS

| Number | Name | Date |
| --- | --- | --- |
| 1,846,854 | Eppenstein | Feb. 23, 1932 |
| 1,991,110 | Mihalyi | Feb. 12, 1935 |
| 2,153,198 | Mihalyi | Apr. 4, 1939 |
| 2,340,623 | Simmon | Feb. 1, 1944 |

FOREIGN PATENTS

| Number | Country | Date |
| --- | --- | --- |
| 676,544 | Germany | June 6 1939 |